(12) United States Patent
Scarella et al.

(10) Patent No.: US 11,343,120 B2
(45) Date of Patent: May 24, 2022

(54) ACTN VIRTUAL NETWORK AUGMENTATION FOR RESOURCE SHARING

(71) Applicant: Telefonaktiebolaget LM Ericsson (publ), Stockholm (SE)

(72) Inventors: Manuela Scarella, Genoa (IT); Daniele Ceccarelli, Sollentuna (SE); Francesco Lazzeri, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 53 days.

(21) Appl. No.: 16/771,494

(22) PCT Filed: Dec. 13, 2017

(86) PCT No.: PCT/EP2017/082712
§ 371 (c)(1),
(2) Date: Jun. 10, 2020

(87) PCT Pub. No.: WO2019/114960
PCT Pub. Date: Jun. 20, 2019

(65) Prior Publication Data
US 2021/0184894 A1    Jun. 17, 2021

(51) Int. Cl.
*H04L 12/46* (2006.01)
*H04W 72/04* (2009.01)

(52) U.S. Cl.
CPC ......... *H04L 12/4633* (2013.01); *H04W 72/04* (2013.01)

(58) Field of Classification Search
None
See application file for complete search history.

(56) References Cited

U.S. PATENT DOCUMENTS 7,969,886 B1 *  6/2011  Hoichman .......... H04L 41/0896
                                                    370/235
9,712,386 B1 *  7/2017  Chen ................. H04L 41/0893
(Continued)

FOREIGN PATENT DOCUMENTS

WO    WO-2018133931 A1 *   7/2018   ............. H04L 45/04

OTHER PUBLICATIONS

Ceccarelli, Daniele, et al., "Framework for Abstraction and Control of Traffic Engineered Networks", TEAS Working Group; Ericsson, Jul. 20, 2017, pp. 1-46.
(Continued)

*Primary Examiner* — Kenny S Lin
(74) *Attorney, Agent, or Firm* — Murphy, Bilak & Homiller, PLLC

(57) ABSTRACT

A method of managing a virtual network, VN, comprising a plurality of VN members comprises associating (710) one or more of the VN members with a first group, the first group including VN members requiring dedicated resource allocations for their corresponding network tunnels, and associating (720) others of the VN members with a second group, the second group comprising VN members that may share resource allocations with other VN members of the second group. Paths are assigned (730, 740) through the one or more physical network domains for the VN members such that the assigned paths for the VN members of the first group provide dedicated resource allocations to each VN member of the first group and such that at least one pair of VN members of the second group traversing a common physical link share a bandwidth allocation for the common physical link.

20 Claims, 8 Drawing Sheets

(56) References Cited

U.S. PATENT DOCUMENTS

| | | | |
|---|---|---|---|
| 2004/0184406 A1* | 9/2004 | Iwamura | H04L 47/762 370/235 |
| 2014/0307556 A1 | 10/2014 | Zhang | |
| 2018/0131570 A1* | 5/2018 | Lee | H04L 41/5051 |
| 2019/0068403 A1* | 2/2019 | Lee | H04L 12/4641 |
| 2019/0199638 A1* | 6/2019 | Ceccarelli | H04L 12/4633 |
| 2020/0389414 A1* | 12/2020 | Bruno | H04L 47/805 |

OTHER PUBLICATIONS

Hajiaghayi, Mohammadtaghi, et al., "Bandwidth Sharing Network Design for Multi-class Traffic", 2006, pp. 1-12.

Lee, Y., et al., "A Yang Data Model for ACTN VN Operation", TEAS Working Group, Oct. 2017, pp. 1-30.

Lee, Y., et al., "PCEP Extensions for Establishing Relationships Between Sets of LSPs and Virtual Networks", PCE Working Group, Sep. 2017, pp. 1-14.

Zhang, Ning, et al., "Software Defined Networking Enabled Wireless Network Virtualization: Challenges and Solutions", Apr. 6, 2017, pp. 1-16.

\* cited by examiner

ACTN VIRTUAL NETWORK AUGMENTATION FOR RESOURCE SHARING

TECHNICAL FIELD

The present disclosure is generally related to the control and management of virtualized networks, and is more particularly related to techniques to facilitate the sharing of physical link bandwidth among multiple tunnels in a virtual network.

BACKGROUND

ACTN (Abstraction and Control of Traffic-Engineered Networks) is a networking paradigm under development, described in the Internet Engineering Task Force (IETF) document "Framework for Abstraction and Control of Traffic Engineered Networks", 20 Jul. 2017 (referred to hereinafter as "ACTN Framework"). ACTN is conceived to facilitate virtual network operation and the creation of a virtualized environment that allows operators to view and control multi-subnet and multi-technology networks as a single virtualized network. ACTN is expected to play a vital role in next-generation service orchestration during the coming 5G era.

In ACTN, the control of the network is multi-stage, as shown in FIG. 1. A set of Physical Network Controllers (PNCs) 110 are in charge of managing the relevant physical network domains 120. On top of these, a parent controller, Multi Domain Service Coordinator (MDSC) 130 enables the management of the global network, allowing the maintenance of end-to-end services across the different domains, with virtual networks (VNs) spanning the domains and additional services. These VNs are the customers' views of the traffic-network; the VNs can be seen as a set of end-to-end tunnels, where each tunnel is referred to a VN member.

PNCs and the MDSC communicate via the MDSC-PNC Interface (MPI). The MDSC exposes to the Customer Network Controller (CNC) 140 a harmonized view of the whole network and accepts the creation, modification and removal of connections via the CNC-MDSC Interface (CMI). Provider edges (PEs) labeled as PEs 1-3 in FIG. 1 provide an interface to the VN for customer networks, via customer edges (CEs), which are not shown in FIG. 1.

A given domain may be responsible for a network segment, e.g., for the fronthaul network or for the core backbone. A domain can be essentially single-layer, e.g., an IP-only domain, or multi-layer, e.g., an Optical Transport Network (OTN)/Dense Wavelength-Division Multiplexing (DWDM).

SUMMARY

ACTN VNs are defined as a set of end-to-end tunnels, called VN members, connecting Access Points (APs), which may be understood as logical identifiers shared between the customers and the providers and used to map the end points of the border nodes in the customer and provider networks. VN members can only have dedicated tunnels, which can cause unwanted bandwidth allocation in cases where it is not needed.

One aspect of the presently disclosed techniques and apparatuses is the extension of the IETF ACTN VN definition, and all the management, control and computation operations implicated by this definition, to allow for the specification of two different types of VN. A first type of VN, described herein as "VN type 1," is a VN with dedicated resources for each VN member. A second type of VN, described herein as "VN type 2," is a VN with VN members sharing resources, i.e., bandwidth, when sharing a portion of the same path, i.e., sharing one or more links. This sharing in a VN type 2 is done on a group basis, meaning that the VN members belonging to the same group can share the resources.

Embodiments of the presently disclosed techniques and apparatus include methods of managing a VN comprising a plurality of VN members, where each VN member comprises a network tunnel traversing one or more physical links through one or more physical network domains. In some embodiments, these methods comprise the steps of associating (710) one or more of the VN members with a first group, the first group comprising VN members requiring dedicated resource allocations for their corresponding network tunnels, and associating one or more others of the VN members with a second group, the second group comprising VN members that may share resource allocations with other VN members of the second group. In these embodiments, the methods further comprise the steps of assigning paths through the one or more physical network domains for the VN members of the first group, such that the assigned paths for the VN members of the first group provide dedicated resource allocations to each VN member of the first group, and assigning paths through the one or more physical network domains for the VN members of the second group, such that at least one pair of VN members of the second group traversing a common physical link share a bandwidth allocation for the common physical link.

According to other embodiments, one or more network nodes are adapted for managing a VN network comprising a plurality of VN members. These one or more network nodes may be adapted to associate one or more of the VN members with a first group, the first group comprising VN members requiring dedicated resource allocations for their corresponding network tunnels, and associate one or more others of the VN members with a second group, the second group comprising VN members that may share resource allocations with other VN members of the second group. The one or more network nodes may be still further adapted to assign paths through the one or more physical network domains for the VN members of the first group, such that the assigned paths for the VN members of the first group provide dedicated resource allocations to each VN member of the first group, and assign paths through the one or more physical network domains for the VN members of the second group, such that at least one pair of VN members of the second group traversing a common physical link share a bandwidth allocation for the common physical link.

In some embodiments, one or several of the one or more network nodes discussed above may each comprise a processor and a memory operatively coupled to the processor and storing program instructions for execution by the processor, such that the respective network node is configured to carry out all or part of the functionality summarized above and/or detailed below. Other embodiments of the presently disclosed invention thus include computer program products comprising all or parts of such program instructions, and computer-readable medium (including non-transitory memory) storing such computer program products. Other embodiments will be made clear to the person of skill in the art upon reading the detailed description below and viewing the accompanying figures.

DETAILED DESCRIPTION

ACTN VNs, as described in the ACTN Framework, can be configured either via Netconf/restconf using YANG models [VN-YANG] or via the Path Computation Element Protocol (PCEP) [VN-PCEP]. A VN is defined as a set of end-to-end tunnels, called VN members, connecting Access Points (APs), which may be understood as logical identifiers shared between the customers and the providers and used to map the end points of the border nodes in the customer and provider networks. VN members can only have dedicated tunnels, which can cause unwanted bandwidth allocation in cases where it is not needed.

There are cases in which multiple VN members go through the same set of resources (i.e., links). In those cases, there might be scenarios in which the bandwidth needs to be allocated multiple times (as the APs are transmitting at full speed at the same time) and other scenarios in which the replication of the bandwidth reservation is a useless waste, e.g., because the APs are not transmitting simultaneously or are transmitting at rates lower than the allocated one.

Figure 1:
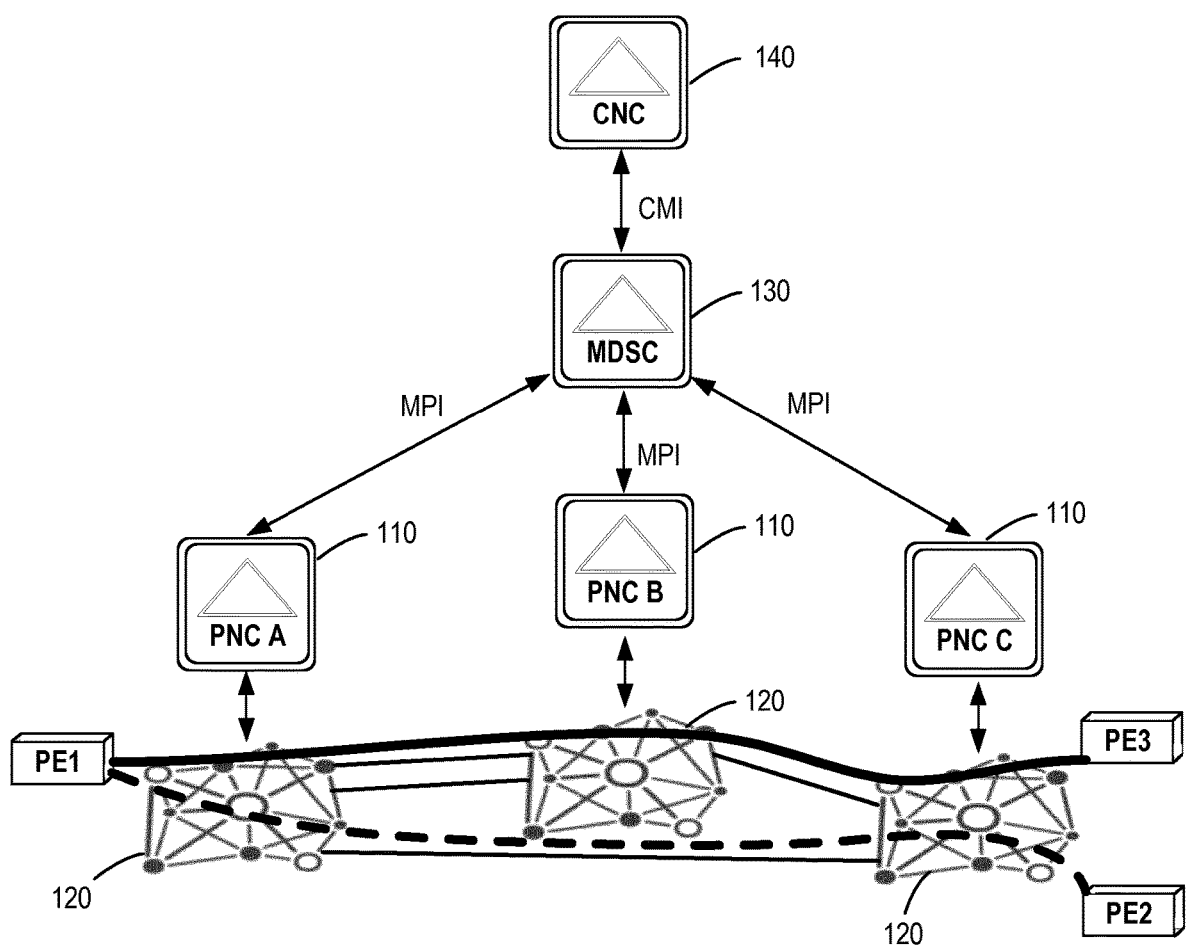
FIG. 1 is a block diagram illustrating the hierarchical control structure defined for ACTN.
Figure 2:
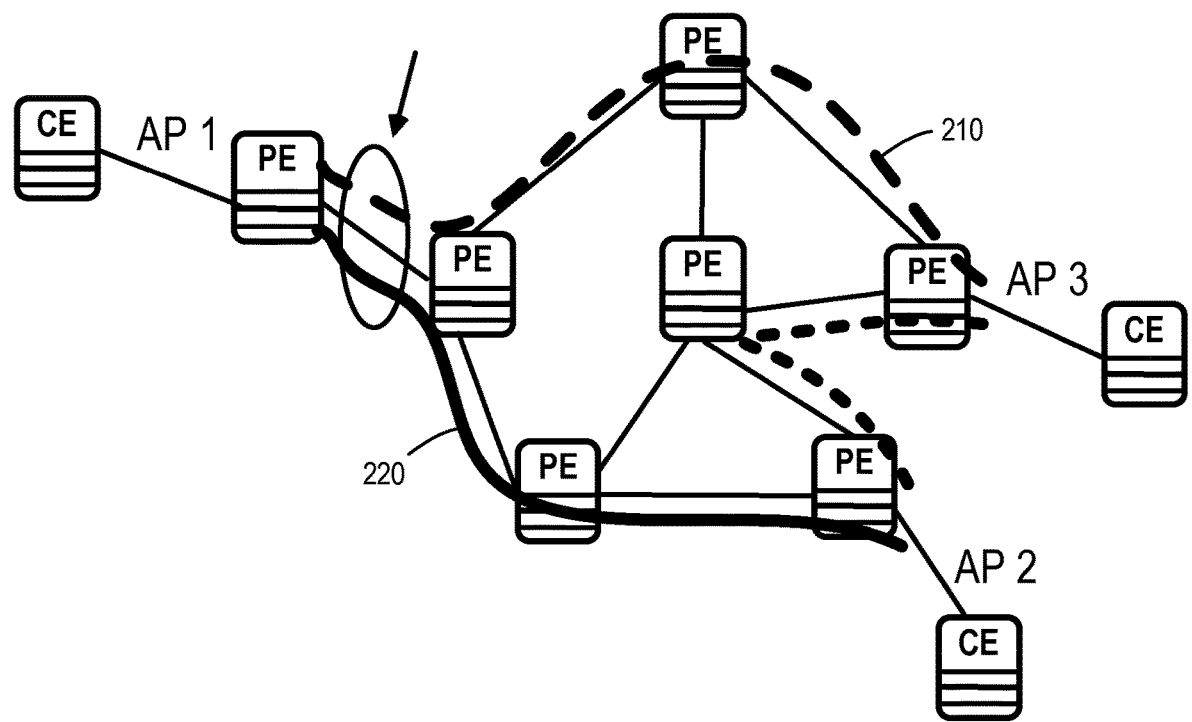
FIG. 2 illustrates a VN scenario highlighting the impact of physical constraints on bandwidth allocation between VN members.
Figure 3:
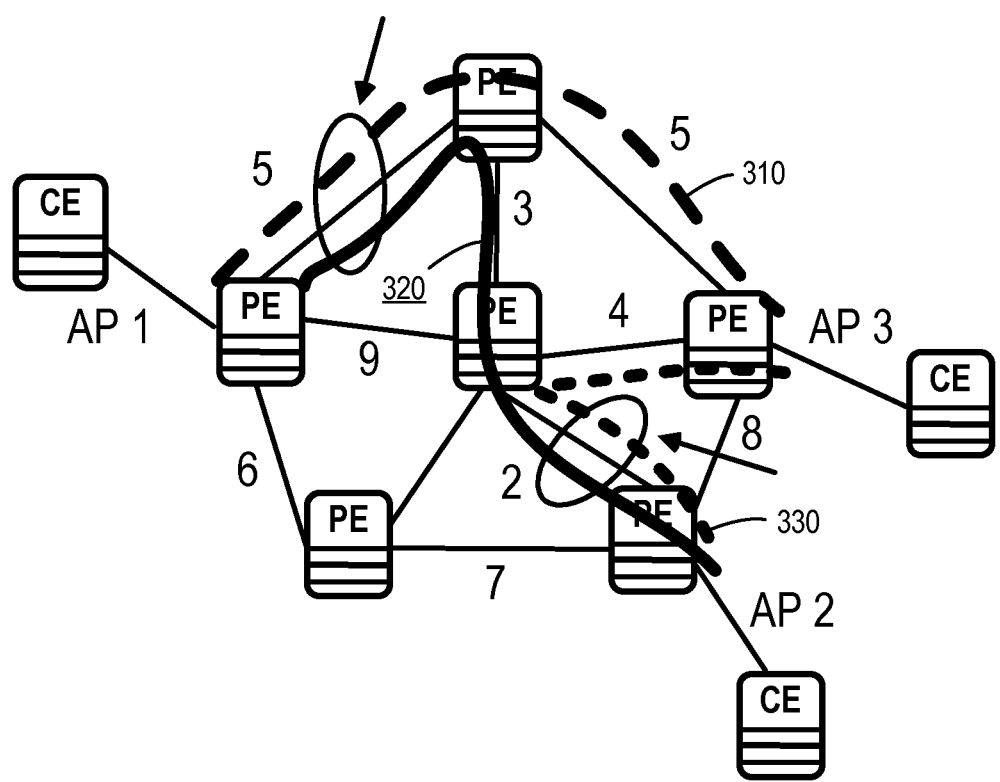
FIG. 3 illustrates a VN scenario highlighting issues involving the optimization of objective functions.

FIGS. 2 and 3 show two cases in which the bandwidth replication is not just a waste, but also causes issues for traffic forwarding. As discussed in further detail below, FIG. 2 illustrates problems involving physical constraints, which can lead to problems with bandwidth allocation, while FIG. 3 illustrates issues involving the meeting of objective functions.

FIG. 2 shows a configured and deployed virtual network connecting access points AP1, AP2, AP3. The nodes labeled "CE" are customer edge routers, while the nodes labeled "PE" are provider edge routers. The physical topology of the network forces VN member 210, traversing the illustrated network between AP1 and AP3, and VN member 220, traversing the network between AP1 and AP2, to share at least one link. In situations in which the traffic is not being sent on any VN member at full rate at the same time, the allocation of the bandwidth on such link for each VN member is an unwanted operation.

In addition to the waste of bandwidth, this situation can also cause a failure of the VN provisioning if, for example, the link bandwidth is lower than the sum of the requested bandwidth for the multiple VN members. Another possible issue can occur in those cases where both the VN members can be accommodated but the wasted capacity prevents the allocation of further VNs, or the scale-up of bandwidth allocation.

FIG. 3 illustrates another scenario in which it is desirable to be able to share bandwidth among VN members—when one or more objective functions are requested against each path. One example of these objective functions might be a minimum delay objective function. In the example shown in FIG. 3, the three VN members 310, 320, and 330 are requested with minimal delay. The numbers adjacent to the links represent the link delays.

In order to route the VN members along the paths with minimal delay, VN members 310 and 320 are requested to share a link. The same is true for VN members 320 and 330. With current approaches, this might not be possible, due to the amount of available bandwidth for a given link being lower than the sum of the bandwidth requested for the link. This would result in the routing of at least one of the VN members through a different path, with worse performance.

The present disclosure addresses these issues by describing modifications to the concept of ACTN virtual network and to the two main interfaces of the ACTN hierarchy, i.e., the CMI and the MPI, as these interfaces are involved in configuration and the discovery of virtual network.

One aspect of the presently disclosed techniques and apparatuses is the extension of the IETF ACTN VN definition, and all the management, control and computation operations implicated by this definition, to allow for the specification of two different types of VN. A first type of VN, described herein as "VN type 1," is a VN with dedicated resources for each VN member. A second type of VN, described herein as "VN type 2," is a VN with VN members sharing resources, i.e., bandwidth, when sharing a portion of the same path, i.e., sharing one or more links. This sharing in a VN type 2 is done on a group basis, meaning that the VN members belonging to the same group can share the resources. Note that the previously existing definition of the ACTN VN corresponds to the VN type 1 as described here.

The definition of a VN with shared resources also implies the definition of a number of new path computation constraints and methods, including, for example, the maximization of the degree of jointness between VN members, the minimization of the same, etc.

The solution described herein, which addresses several problems with the current concept of ACTN virtual network, defines an extension of the IETF VN definition and model, providing more flexibility in the usage of resources. At the same time, this extension maintains compatibility with the previous definition.

In the following, the data model (YANG) of the ACTN VN is used as example to explain the changes to the definition. It will be appreciated, however, that such changes are independent of the type of control or management protocol used to configure the VN and apply to it definition.

In the previous model, the VN has been defined as shown in Table 1, and in particular as a list of VN member (the end to end connections spanning multiple domains). Here, only the most significant parameters are reported, so as to show the previous approach compared to the presently disclosed approach.

TABLE 1

```
container vn {
        list vn-list {
                key "vn-id";                            //identifier of the VN
                leaf vn-name { type string; };          //name of the VN
                list vn-member-list{   //list of VN members composing the VN
                        key "vn-member-id";             //id of the VN members
                        uses metrics-op;     //characteristics of the VN members
                        leaf oper-status {...}
                        leaf tunnel-ref {   //the list of tunnels that compose a VN
                                type te:tunnel-ref;
                        }
                }
                uses service-metric;
                leaf admin-status {...}
                leaf oper-status {...}
        }//vn-list
    }//vn
```

The presently described approach can be summarized in two main improvements:

1. A type is associated to the VN member. The type is used to specify whether that given VN member needs to have dedicated resources in the network, or whether that VN member can share resources with other VN members.

that the VN members within a sharing group can share resources with VN members of that same group but not with VN members of another group (except for, in some embodiments, VN members that are in both groups).

Table 2 shows an augmented version of the VN data models, with a description of the various fields.

TABLE 2

```
augment "/vn:vn/vn-id" {
  uses virtual-shared-resources-info;}
grouping virtual-shared-resources-info {
                description "this is a way to classify vn-members: there is a list of groups
                of VN-members able to share resources and a specific group of VN-
                members that are not able to share resources and then they have
                dedicated resources";
        list vn-shared-resources-groups {
                description "this is a list of vn-members groups that share resources,
                groups are disjoint and they can use different sharing criteria";
                key group-id;
                uses vn-members-group;
        }
        leaf vn-dedicated-resources-group {
                description "all vn-members with dedicated resources";
                uses vn-members-group;
        }
        leaf vn-dedicated-resources-group {
                description "all vn-members with dedicated resources";
                uses vn-members-group;
        }
}
        grouping vn-members-group {
                leaf group-id {
                        description "identifier of the group of vn/members inside the vn";
                        type inet:uri;
                }
                uses sharing-criteria;
                        description "the field sharing-criteria is used to define a
                        mechanism to share resources into the group. This is a way to
                        share the same mechanism to compute paths between the same
                        couple of end points";
                list vir-net-members {
                        key vn-member-id;
                }
        }
```

2. The concept of "group of VN members" is defined. A group of VN members consists of all the VN members of the same type and, for VN members that are allowed to share resources with other VN members, that share a given amount of resources. A VN member can be associated to a group of VN members sharing resource or a group of VN members with dedicated resources. Note that there can be multiple sharing groups, such In the following, this new approach is applied to the examples discussed above, and explanations of how the problems are solved are provided.

Figure 4:
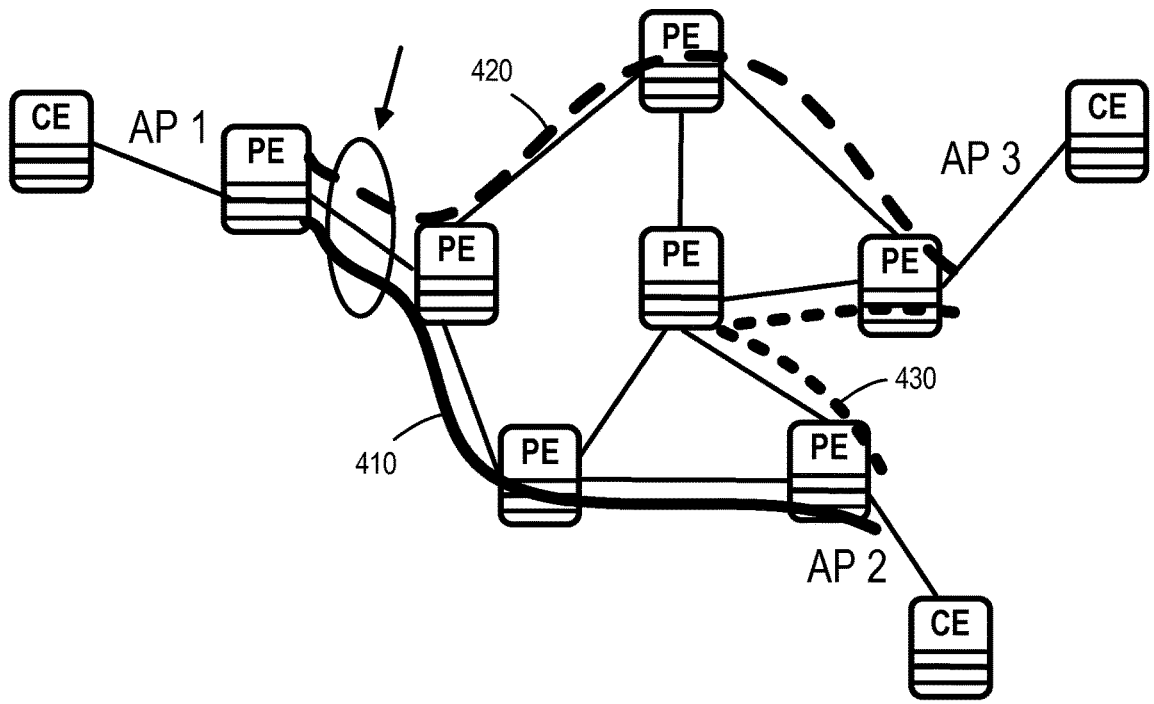
FIG. 4 illustrates the application of a shared-bandwidth VN member group to the scenario of FIG. 2.
Figure 4:
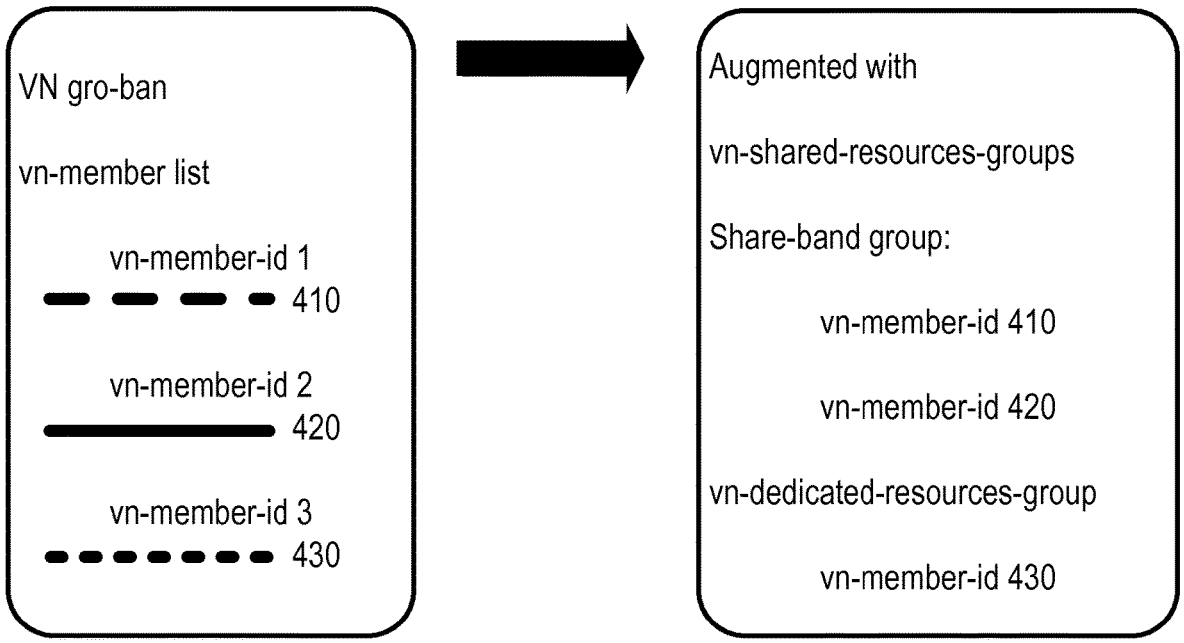

FIG. 4 illustrates how the presently disclosed techniques can be used to overcome the physical constraints discussed above, by allowing bandwidth to be shared between VN members. In FIG. 4, it can be seen that VN members 410 and 420 can share the bandwidth in the circled path/link. This way there is no waste of dedicated bandwidth. Both paths are computed using the same metric, and bandwidth sharing is preferred to total diversity. In the same VN, VN member 430 carries traffic requiring guaranteed bandwidth, so it is in the dedicated resources-group, and is not permitted to share resources with other VN members.

Figure 5:
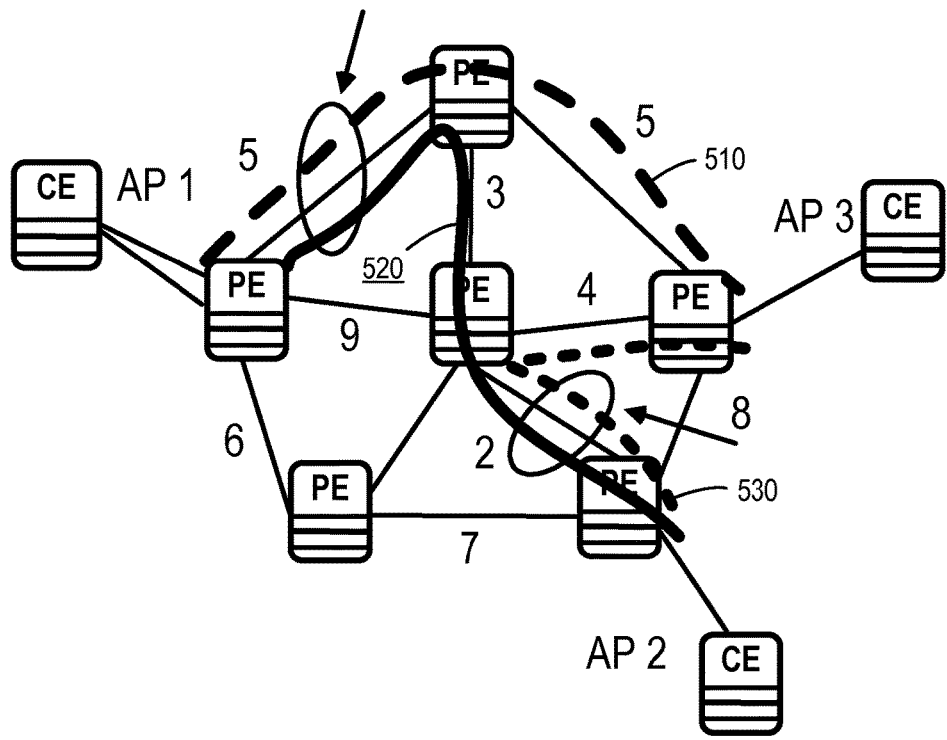
FIG. 5 illustrates an application of a shared-bandwidth VN member group to address objective function optimization.
Figure 5:
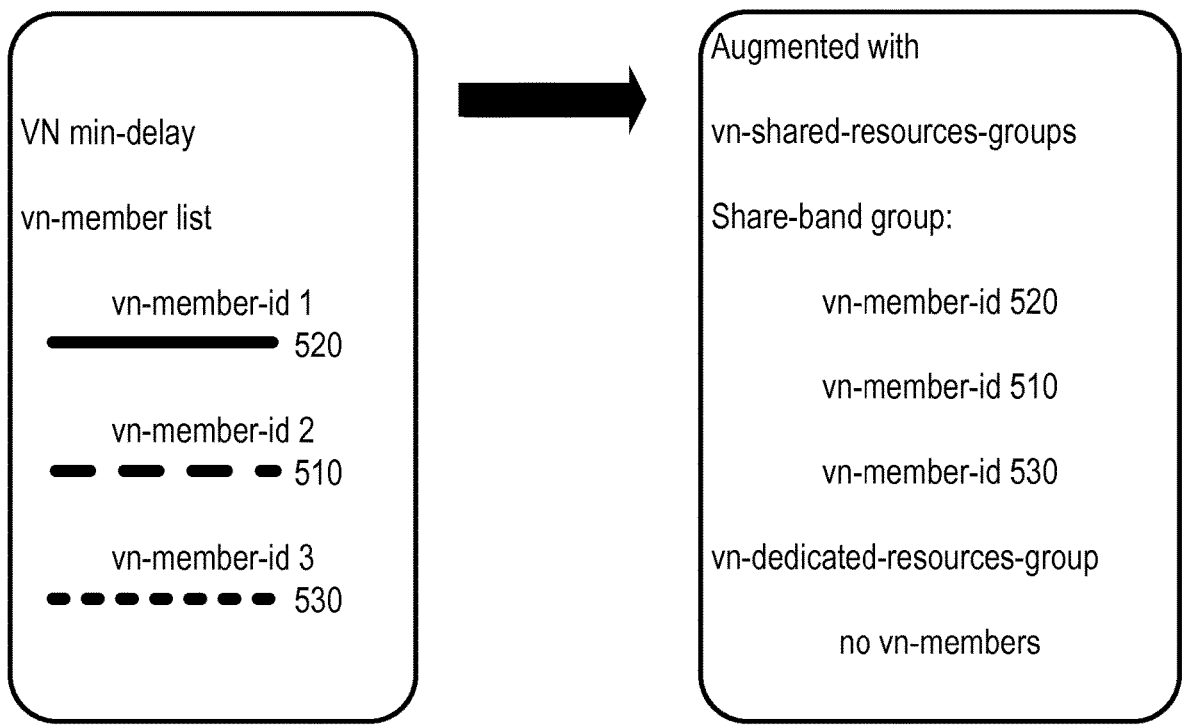

FIG. 5 illustrates another example on how the extension of VN concept helps to optimize the usage of resources and to use them in a more specific way. More specifically, FIG. 5 illustrates how the issue of maximizing or minimizing objective functions can be accomplished, using the presently disclosed techniques. In this example, optimizing the objective function is preferred over diversity.

In this scenario, the VN members of the VN group called "vn-min-delay" all need paths with minimum delay. Using the presently disclosed techniques, there is the possibility to group all these VN members in a category that provides the possibility of sharing portions of paths using another objective function instead of the usual diversity to compute the paths. Thus, VN members 510 and 520 share one link (circled) so that the delays can be minimized for both VN members. Likewise, VN members 520 and 530 also share one link (also circled), so as to minimize the delays for each.

Conceptually, a set of shared tunnels having the same ingress access point is very similar to a point-to-multipoint (P2MP) connection, where the common sub-tree has a bandwidth occupation equal to the one of one single tunnel. The path computation and the options to share the bandwidth of such a VN group can thus be done in the same way as done for a P2MP connection.

A fundamental difference, however, is that the actual tunnels are point-to-point in nature, as the traffic between the ingress and the different egresses is generally not the same. This means that, after the path computation, the routes of the tunnels shall be used to deploy a set of independent end-to-end tunnels, each allocating the bandwidth requested between its endpoints.

These tunnels must be set at a lower priority level than the dedicated tunnels, however, in order to prevent packet drops on dedicated tunnels (of the same or of other VNs). This issue could happen when shared tunnels try to use more than the available bandwidth on one of those links.

Figure 6:
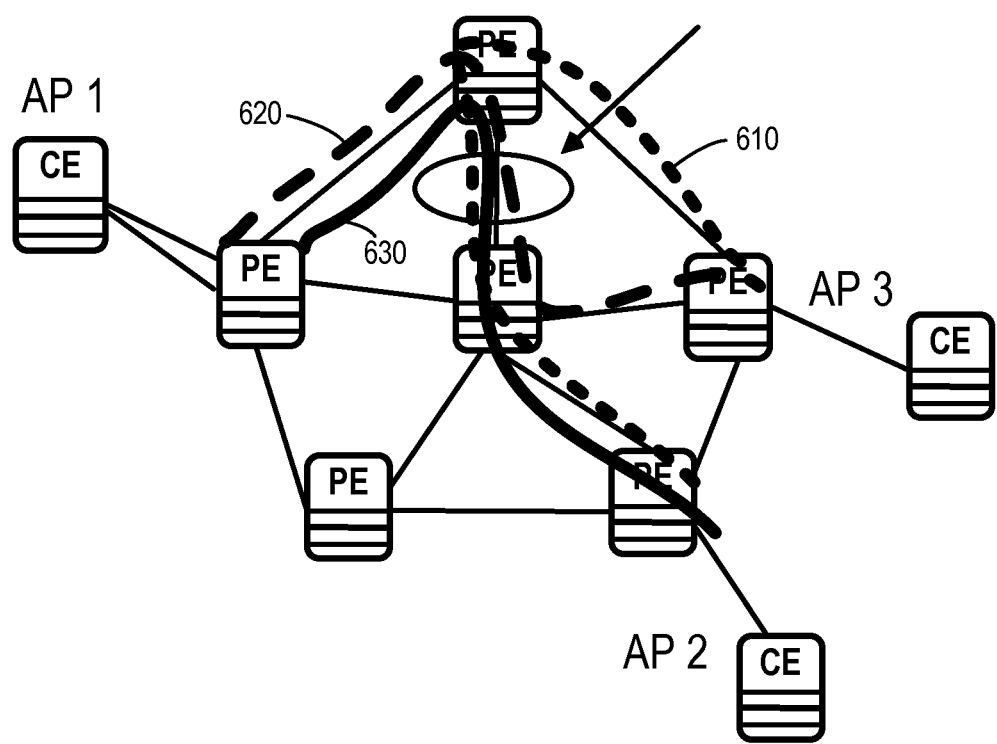
FIG. 6 illustrates a VN scenario where two types of VN members share physical links.

In the scenario shown in FIG. 6, a link is circled where both a type 1 VN member 610 (dedicated) and the type 2 VN members 620 and 630 (shared) are present. The dedicated tunnel for VN member 610 must have its bandwidth guaranteed even when the shared ones have a peak of bandwidth usage. In that case, packets for only the shared tunnels are dropped, as needed.

There are a number of methods to carry out such operations. It is possible, for instance, to configure shared tunnels as lower priority and dedicated tunnels as higher priority, using, for example, the EXP bits of MPLS, as implemented by a number of router vendors.

It is also possible to include, in a given sharing group, tunnels that do not have the same ingress access point. In this case, the path computation algorithms are different, but the other considerations discussed herein continue to apply.

As discussed above, sharing and optimization criteria can be associated to the VN groups with sharing attribute set. Possible sharing criteria fall into these two categories:

Shortest path: minimize the cost of the "longest" (i.e., maximum cost, where the cost is selectable among IGP, TE, delay, and so on) tunnel in the group. If it is desired to reduce as much as possible the latency in the VN group, a shortest path criterion is selected, where the metric is the delay.

Minimum aggregated cost: minimize the cost of the whole set of tunnels in the VN group. A shared link's cost is counted only once. If it is desired to maximize the bandwidth sharing in the VN group, a special case of the minimum aggregated cost may be used, where the selected cost is the number of hops.

It is also possible to put a limit on the maximum number of tunnels passing through the same link.

All of these are additional path computation constraints to be used together with the conventional constraints used to compute paths for VN tunnels.

In summary, in various embodiments of the presently disclosed techniques and apparatus, the definition of ACTN Virtual Network is augmented, so that tunnels, i.e., VN members, can be designated as dedicated (having guaranteed bandwidth) or shared. Bandwidth sharing can be used for:

Lower priority VNs whose VN members share resources with VN members in the in the same sharing group, and/or VNs with High priority but whose VN members are not used at the same time (e.g. data center backup)

Shared VN members use special path computation algorithms and bandwidth accounting on the network controller in order to be managed. Their deployment in the network is the same of other VN members, with the exception that they are configured to allow them to drop packets in case of congestion, so as to prevent packet drops by dedicated VN members.

Figure 7:
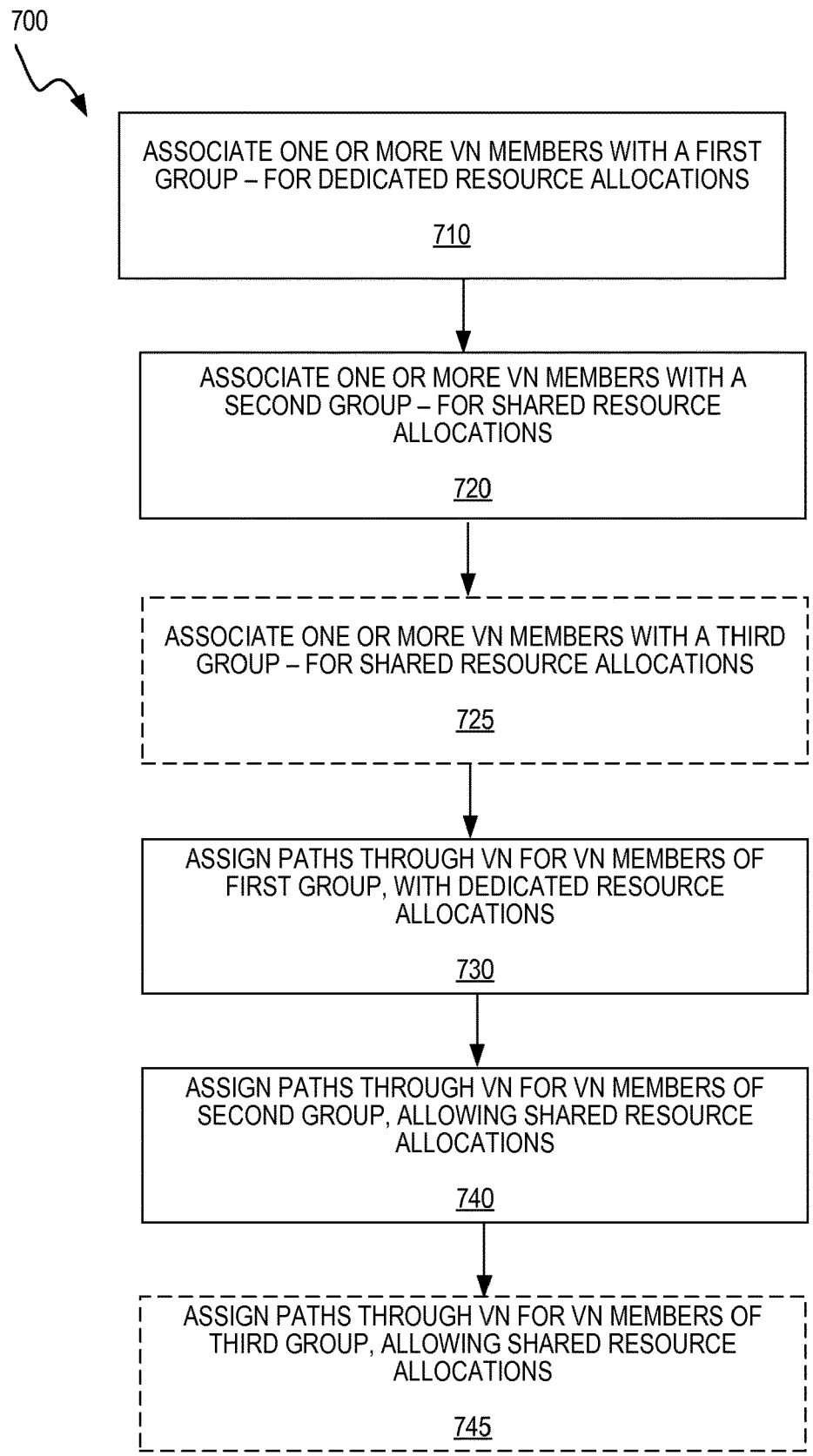
FIG. 7 is a process flow diagram illustrating an example method for managing a VN according to some embodiments.

FIG. 7 is a process flow diagram illustrating a method of managing a VN, such as an ACTN VN, according to several of the presently disclosed techniques, where the VN comprises a plurality of VN members, each VN member comprising a network tunnel traversing one or more physical links through one or more physical network domains. As shown at block 710, the method includes associating one or more of the VN members with a first group, where the first group comprises only VN members requiring dedicated resource allocations for their corresponding network tunnels. As shown at block 720, the method further includes associating one or more others of the VN members with a second group, the second group comprising VN members that may share resource allocations with other VN members of the second group.

As shown at block 730, the method further comprises assigning paths through the one or more physical network domains for the VN members of the first group, such that the assigned paths for the VN members of the first group provide dedicated resource allocations to each VN member of the first group. As shown at block 740, the method still further comprises assigning paths through the one or more physical network domains for the VN members of the second group, such that at least one pair of VN members of the second group traversing a common physical link share a bandwidth allocation for the common physical link. It will be appreciated, of course, that other pairs of VN members of this second group may share bandwidth allocations for any common link traversed by the respective pair.

As noted above, there may be more than one "sharing" group of VN members, such that the members of any given group of the sharing type may share resource allocations with other VN members of the same group, but not with VN members that are not part of the same group. Thus, as shown at block 725, the example method of FIG. 7 may include associating one or more others of the VN members with a third group, the third group comprising VN members that may share resource allocations with other VN members of the third group but may not share resource allocations with VN members of the second group. Further, as shown at block 745, the method may include assigning paths through the one or more physical network domains for the VN members of the third group, such that at least one pair of VN members of the third group traversing a common physical link share a bandwidth allocation for the common physical link. Blocks 725 and 745 are illustrated with dashed outlines to indicate that they need not appear in every embodiment or instance of the illustrated method.

In some embodiments, VN members of the second group are associated with a first service or application and VN members of the third group are associated with a second service or application, the first service or application differing from the second service or application. Thus, VN members associated with a given service or application may share resources with other VN members associated with that same service or application, in some embodiments, but not with VN members associated with other services or applications. It will be appreciated that this facilitates the providing of a different quality-of-service (QoS) for each of several different services or applications. Thus, for example, assigning paths to the VN members of the second and third groups may be performed according to first and second sets of bandwidth sharing rules, respectively, where the first and second sets of bandwidth sharing rules differ from one another.

In some embodiments, assigning paths through the one or more physical network domains for the VN members of the second group comprises computing paths to minimize a cost of the maximum-cost path among VN members of the second group. In other embodiments, assigning paths through the one or more physical network domains for the VN members of the second group comprises computing paths to minimize an aggregated cost of paths for VN members of the second group, where a cost for each link shared by two or more VN members of the second group is counted only once in the aggregated cost. In any of these embodiments, path costs might be computed in terms of one of the following: Interior Gateway Protocol (IGP) link metrics, traffic engineering (TE) link metrics, link delay metrics, and a number of hops in the respective path. It will be appreciated that various conventional path computation schemes may be adapted for use in assigning the paths for both the shared and dedicated VN member types. In some embodiments, for example, assigning paths through the one or more physical network domains for the VN members of the second group comprises assigning the paths such that no more than a predetermined number of tunnels for VN members of the second group share any given physical link.

It will be appreciated that the techniques illustrated in FIG. 7, and the several variations thereof described above, can be carried out by one or several network nodes, in various embodiments, where the term "network node" is used to refer to any network-connected apparatus, such as a server, router, etc. In some embodiments, for example, the associating of VN members with groups may be performed by one or more application servers, running one or more respective applications that use the respective groups of VN members. The assigning of paths to the VN members may be carried out by one or many path computation elements (PCEs), which may be understand as logical nodes that correspond to one or several physical network nodes.

Figure 8:
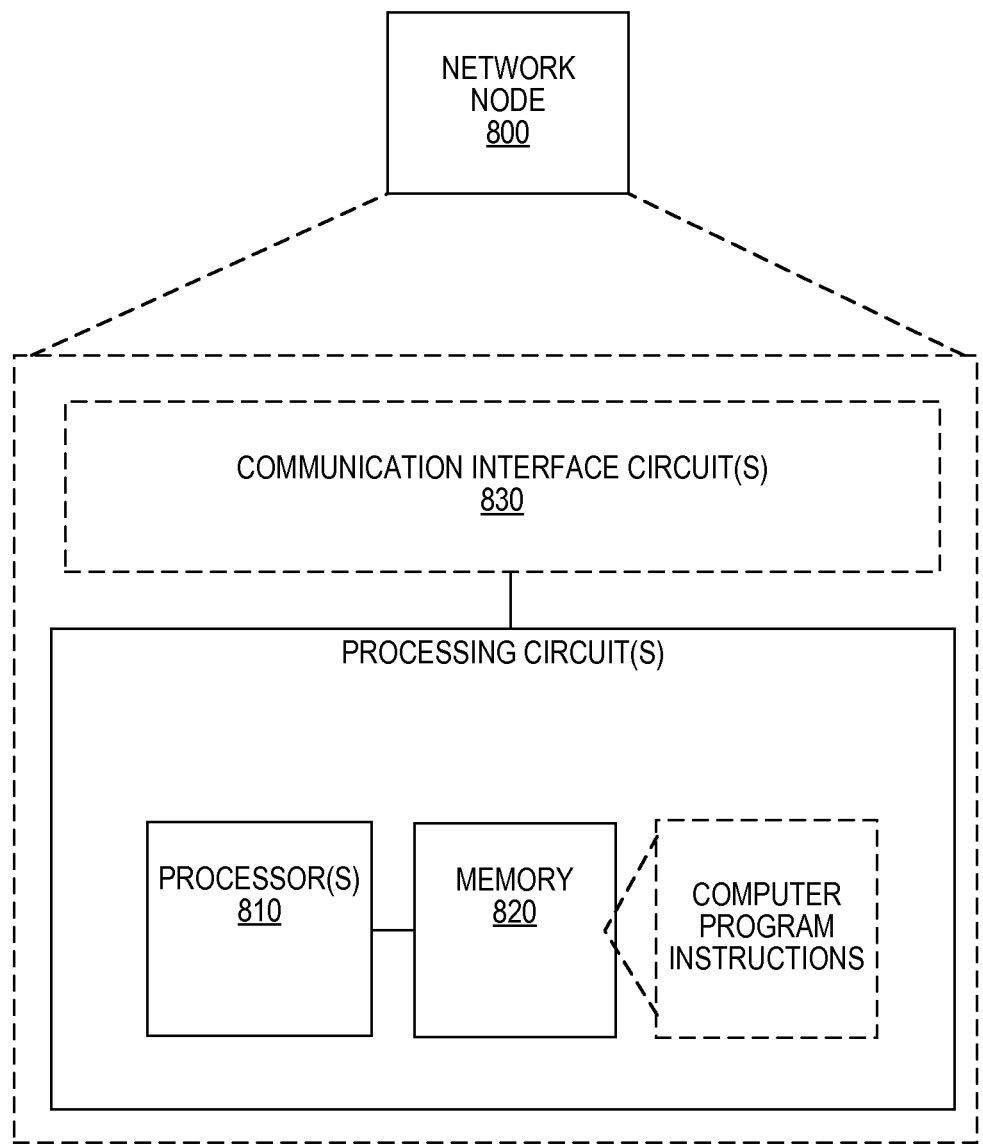
FIG. 8 is a block diagram illustrating an example node configured to carry out all or parts of one or more of the techniques disclosed herein.

FIG. 8 illustrates an example network node 800, which may be configured to carry out one, several, or all of the various operations described above, e.g., as illustrated in FIG. 7. As shown in FIG. 8, network node 800 includes at least one processor 810 and a memory 820 operatively coupled to the processor 810 and storing program instructions for execution by processor 810. Network node 800 further includes a network interface circuit 830 operatively coupled to the processor 810 and configured for communication with one or more other network nodes.

The program instructions stored by memory 820 for execution by processor 810 are configured to cause the network node 800 to carry out some or all of the functions that are described herein. Thus, one or several network nodes having a configuration like that shown in FIG. 8 may work together to carry out one or more of the methods disclosed. Thus, for example, one or more network nodes 800 may be adapted to manage a VN, such as an ACTN VN, comprising a plurality of VN members. More specifically, the one or more network nodes 800 may be adapted to associate one or more of the VN members with a first group, the first group comprising VN members requiring dedicated resource allocations for their corresponding network tunnels, and associate one or more others of the VN members with a second group, the second group comprising VN members that may share resource allocations with other VN members of the second group. The one or more network nodes may be further adapted to assign paths through the one or more physical network domains for the VN members of the first group, such that the assigned paths for the VN members of the first group provide dedicated resource allocations to each VN member of the first group, and assign paths through the one or more physical network domains for the VN members of the second group, such that at least one pair of VN members of the second group traversing a common physical link share a bandwidth allocation for the common physical link.

It should be understood that these one or more network nodes may be adapted to carry out any of the several variations of the techniques described in connection with the description of FIG. 7. In some embodiments, the one or more network nodes 800 carrying out any of these methods may comprise one or more application servers adapted to associate the one or more VN members with the first group and to associate the one or more others of the VN members with the second group, and further comprise one or more PCEs adapted to assign paths through the one or more physical network domains for the VN members of the first and second groups. Various other physical configurations of network nodes adapted to carry out any of these methods are also possible.

The new definition of the ACTN VN and the techniques described herein can provide several advantages. For instance, the disclosed techniques can provide cost savings for customer, and a wider portfolio offering for service providers. With the new groups of VN members that can share resources, in a VN type 2, the customers can reduce unused resources to the minimum, as the link bandwidths are used by the active connections according to current needs. On the other hand, if a specific customer needs high-quality, fully guaranteed services, the wider offer allows him to buy a more expensive service, according to a VN type 1, characterized by dedicated resources.

Further, the definitions and techniques described herein simplify the virtual network concept and provide for better utilization of the network resources. From a technical perspective there are advantages of a clear definition as in any moment it is easy to know which are the most reliable services to cross the network and how the traffic is distributed. Using different objective functions, the traffic can be moved on the chosen zones of the network according to network owner requirements.

The invention claimed is:

1. A method of managing a virtual network (VN) comprising a plurality of VN members, each VN member comprising a network tunnel traversing one or more physical links through one or more physical network domains, the method comprising:
associating one or more of the VN members with a first group, the first group comprising VN members requiring dedicated resource allocations for their corresponding network tunnels;
associating one or more others of the VN members with a second group, the second group comprising VN members that may share resource allocations with other VN members of the second group;
assigning paths through the one or more physical network domains for the VN members of the first group, such that the assigned paths for the VN members of the first group provide dedicated resource allocations to each VN member of the first group; and
assigning paths through the one or more physical network domains for the VN members of the second group, such that at least one pair of VN members of the second group traversing a common physical link share a bandwidth allocation for the common physical link.

2. The method of claim 1, wherein the VN is an Abstraction and Control of Traffic-Engineered Networks (ACTN) VN.

3. The method of claim 1, wherein the method further comprises:
associating one or more others of the VN members with a third group, the third group comprising VN members that may share resource allocations with other VN members of the third group but may not share resource allocations with VN members of the second group; and
assigning paths through the one or more physical network domains for the VN members of the third group, such that at least one pair of VN members of the third group traversing a common physical link share a bandwidth allocation for the common physical link.

4. The method of claim 3, wherein the VN members of the second group are associated with a first service or application and VN members of the third group are associated with a second service or application, the first service or application differing from the second service or application.

5. The method of claim 3, wherein assigning paths to the VN members of the second and third groups is performed according to first and second sets of bandwidth sharing rules, respectively, the first and second sets of bandwidth sharing rules differing from one another.

6. The method of claim 1, wherein assigning paths through the one or more physical network domains for the VN members of the second group comprises computing paths to minimize a cost of the maximum-cost path among VN members of the second group.

7. The method of claim 1, wherein assigning paths through the one or more physical network domains for the VN members of the second group comprises computing paths to minimize an aggregated cost of paths for VN members of the second group, where a cost for each link shared by two or more VN members of the second group is counted only once in the aggregated cost.

8. The method of claim 1, wherein assigning paths through the one or more physical network domains for the VN members of the second group comprises assigning the paths such that no more than a predetermined number of tunnels for VN members of the second group share any given physical link.

9. One or more network nodes for managing a virtual network (VN) comprising a plurality of VN members such that each VN member comprises a network tunnel traversing one or more physical links through one or more physical network domains, the one or more network nodes being configured to:
associate one or more of the VN members with a first group, the first group comprising VN members requiring dedicated resource allocations for their corresponding network tunnels;
associate one or more others of the VN members with a second group, the second group comprising VN members that may share resource allocations with other VN members of the second group;
assign paths through the one or more physical network domains for the VN members of the first group, such that the assigned paths for the VN members of the first group provide dedicated resource allocations to each VN member of the first group; and
assign paths through the one or more physical network domains for the VN members of the second group, such that at least one pair of VN members of the second group traversing a common physical link share a bandwidth allocation for the common physical link.

10. The one or more network nodes of claim 9, wherein the VN is an Abstraction and Control of Traffic-Engineered Networks (ACTN) VN.

11. The one or more network nodes of claim 9, wherein the one or more network nodes comprise one or more application servers configured to associate the one or more VN members with the first group and to associate the one or more others of the VN members with the second group, and wherein the one or more network nodes further comprise one or more path computation elements (PCEs) configured to assign paths through the one or more physical network domains for the VN members of the first and second groups.

12. The one or more network nodes of claim 9, wherein the one or more network nodes are further configured to:
associate one or more others of the VN members with a third group, the third group comprising VN members that may share resource allocations with other VN members of the third group but may not share resource allocations with VN members of the second group; and
assign paths through the one or more physical network domains for the VN members of the third group, such that at least one pair of VN members of the third group traversing a common physical link share a bandwidth allocation for the common physical link.

13. The one or more network nodes of claim 12, wherein the VN members of the second group are associated with a first service or application and VN members of the third group are associated with a second service or application, the first service or application differing from the second service or application.

14. The one or more network nodes of claim 12, wherein the one or more network nodes are configured to assign paths to the VN members of the second and third groups according to first and second sets of bandwidth sharing rules, respectively, the first and second sets of bandwidth sharing rules differing from one another.

15. The one or more network nodes of claim 9, wherein the one or more network nodes are configured to assign paths through the one or more physical network domains for the VN members of the second group by computing paths to minimize a cost of the maximum-cost path among VN members of the second group.

16. The one or more network nodes of claim 15, wherein the one or more network nodes are configured to compute the path costs in terms of one of the following:
   Interior Gateway Protocol (IGP) link metrics;
   traffic engineering (TE) link metrics;
   link delay metrics;
   a number of hops in the respective path.

17. The one or more network nodes of claim 9, wherein the one or more network nodes are configured to assign paths through the one or more physical network domains for the VN members of the second group by computing paths to minimize an aggregated cost of paths for VN members of the second group, where a cost for each link shared by two or more VN members of the second group is counted only once in the aggregated cost.

18. The one or more network nodes of claim 9, wherein the one or more network nodes are configured to assign paths through the one or more physical network domains for the VN members of the second group such that no more than a predetermined number of tunnels for VN members of the second group share any given physical link.

19. One or more network nodes configured to manage a virtual network (VN) comprising a plurality of VN members such that each VN member comprises a network tunnel traversing one or more physical links through one or more physical network domains, the one or more network nodes each comprising a processor and a memory operatively coupled to the processing circuit and storing program instructions for execution by the processor, whereby the one or more network nodes are configured to:
   associate one or more of the VN members with a first group, the first group comprising VN members requiring dedicated resource allocations for their corresponding network tunnels;
   associate one or more others of the VN members with a second group, the second group comprising VN members that may share resource allocations with other VN members of the second group;
   assign paths through the one or more physical network domains for the VN members of the first group, such that the assigned paths for the VN members of the first group provide dedicated resource allocations to each VN member of the first group; and
   assign paths through the one or more physical network domains for the VN members of the second group, such that at least one pair of VN members of the second group traversing a common physical link share a bandwidth allocation for the common physical link.

20. The one or more network nodes of claim 19, wherein the one or more network nodes are further configured to:
   associate one or more others of the VN members with a third group, the third group comprising VN members that may share resource allocations with other VN members of the third group but may not share resource allocations with VN members of the second group; and
   assign paths through the one or more physical network domains for the VN members of the third group, such that at least one pair of VN members of the third group traversing a common physical link share a bandwidth allocation for the common physical link.

* * * * *